US007430112B2

(12) United States Patent
Hsieh et al.

(10) Patent No.: US 7,430,112 B2
(45) Date of Patent: Sep. 30, 2008

(54) TERMINAL COMPUTER DISPLAY ASSEMBLY

(75) Inventors: Min Yuan Hsieh, Taipei (TW); Wen-Chin Lin, Taipei Hsien (TW)

(73) Assignee: Tul Cooperation, Taipei Hsien (TW)

( * ) Notice: Subject to any disclaimer, the term of this patent is extended or adjusted under 35 U.S.C. 154(b) by 514 days.

(21) Appl. No.: 11/283,837

(22) Filed: Nov. 22, 2005

(65) Prior Publication Data

US 2006/0118686 A1 Jun. 8, 2006

(30) Foreign Application Priority Data

Dec. 3, 2004 (TW) ............... 93137312 A

(51) Int. Cl.
*G06F 1/16* (2006.01)
(52) U.S. Cl. .................. 361/681; 248/276.1
(58) Field of Classification Search ......... 361/681; 248/276.1, 917–924
See application file for complete search history.

(56) References Cited

U.S. PATENT DOCUMENTS

| 6,378,830 B1 | 4/2002 | Lu |
| 6,478,275 B1 | 11/2002 | Huang |
| D493,468 S | 7/2004 | Serbinski et al. |
| 2004/0011932 A1* | 1/2004 | Duff ........................... 248/157 |
| 2004/0084585 A1* | 5/2004 | Watanabe et al. ......... 248/276.1 |
| 2004/0084588 A1* | 5/2004 | Liu et al. ................. 248/291.1 |
| 2004/0113031 A1* | 6/2004 | Sung ........................... 248/146 |

FOREIGN PATENT DOCUMENTS

TW 590250 6/2004

OTHER PUBLICATIONS

U.S. Appl. No. 11/252,127, filed Oct. 17, 2005, Chiu.*
U.S. Appl. No. 10/805,848, filed Mar. 22, 2004, Tanimoto, et al.*
U.S. Appl. No. 10/799,624, filed Mar. 15, 2004, Chen, et al.*
U.S. Appl. No. 10/297,420, filed Dec. 5, 2002, Iredale.*
U.S. Appl. No. 10/694,041, filed Oct. 28, 2003, Lee, et al.*
U.S. Appl. No. 10/921,980, filed Aug. 20, 2004, Jang.*
U.S. Appl. No. 10/949,704, filed Sep. 24, 2004, Titzler, et al.*
U.S. Appl. No. 10/170,826, filed Jun. 13, 2002, Moscovitch.*
U.S. Appl. No. 10/401,776, filed Mar. 31, 2002, Jung, et al.*
U.S. Appl. No. 10/755,306, filed Jan. 13, 2004, Lin.*
U.S. Appl. No. 11/044,167, filed Jan. 28, 2005, Hsiao.*
U.S. Appl. No. 11/109,050, filed Apr. 19, 2005, Hsu.*
U.S. Appl. No. 11/018,437, filed Dec. 21, 2004, Yokouchi, et al.*

* cited by examiner

*Primary Examiner*—Lisa Lea-Edmonds
(74) *Attorney, Agent, or Firm*—Rabin & Berdo, P.C.

(57) ABSTRACT

A terminal computer display assembly, which fixes a monitor onto a rotary supporting base provided. The support has a set of rails with a plurality of positioning units longitudinally aligned, and an inclined angular-positioning unit to limit the backward inclination of the support within a particular range of angles. The monitor is fixed onto a sliding block which is attached to the set of rails, allowing the monitor to move up or down freely for in a suitable highly location. A buffering unit is installed between the sliding block and the base, and it can prevent the monitor from falling instantaneously while positioning the height. The base is furthermore built with a circuit board inside for act as in interface for connecting to other accessories.

16 Claims, 6 Drawing Sheets

TERMINAL COMPUTER DISPLAY ASSEMBLY

BACKGROUND OF THE INVENTION (a) Field of the Invention

This invention is related to the mechanical design of a terminal computer display, in particular a display that can be turned, leaned backwards, and adjusting the height.

(b) Description of the Prior Art

There are many designs for a stand that can support a displaying screen, also called a monitor. For example, U.S. Des. Pat. No. D493468 is such an ornamental design.

The usual desktop monitors will need to be able to adjust its height, distance from the user's eyes, and angle according to what's most comfortable for the user. Therefore, its adjustability is essential. And for this reason, most of the monitors nowadays are designed, and hoping, to be able to suit the needs of its user as comfortable as possible, especially for LCD monitors.

Monitors designed to be able to lean backwards or rotate have been seen in previous patent articles. For example, U.S. Pat. No. 6,378,830 is an adjustable monitor that is mounted on a base plate and can be turned on a horizontal axe or a vertical axe. The U.S. Pat. No. 6,478,275 is using a movable bracket device secured onto a wall or a desk, and has the monitor or other objects pivoted on the other end, hence it can be moved to the desired position by the user. Taiwan Patent No. 590,250 is also a design to adjust the height of a monitor by using a groove matched with project element, and securing the monitor with a positioning locking pin. The pin has to be pulled out and re-inserted every time when adjusting the height of the monitor, which can cause inconvenience when operating.

In order to make users of different height feel comfortable when using the computer, it is essential that the monitor can be adjusted the height, moved up or down. However, until now, due to certain mechanical structures of all of the relevant designs of height adjustment of monitors, none can seem to prevent the monitor from falling instantaneously.

SUMMARY OF THE INVENTION

The object of this invention is to provide a terminal computer display assembly in which the user can easily move a monitor up or down to adjust its height without having the need to use both hands.

The second object of this invention is to provide a terminal computer display assembly such that the monitor will not fall down suddenly when adjusting its height.

Another object of the present invention is to provide a terminal computer display assembly such that it will enable the monitor to be turned, moved up or down, inclined backwards, and at the same time the base of the terminal computer display assembly will contain an interface circuit board for plugging other accessories.

The furthermore object of this invention is to provide a terminal computer display assembly as a lifting device such that it will prevent a weight unit, in this embodiment the monitor, from falling suddenly when junction unit is released from the positioning unit. It will also enable the monitor to be turned, moved up or down and inclined backwards after assembly.

In order to achieve the objectives above, the terminal computer display assembly will also act as a lifting device consisting of a base and a support. The support will be mounted onto the base, and the support will have a set of rails and a plurality of longitudinal positioning units, plus an inclined angular-positioning unit is installed to limit the range of angles of inclination of the support.

A weight unit, such as a monitor, is fixed onto the sliding block together with the set of rails, it can move up or down freely, also using the positioning unit to fix the weight unit at the desirable height for the user. A junction unit is mounted onto a sliding block for locking the support at any one place of the positioning units. Furthermore, a buffering unit is mounted between the sliding block and the base, by this way; it will have a variable supporting force to prevent the weight unit from falling down suddenly when adjusting the height, in which the junction will be temporarily disconnected from the positioning unit.

More specifically, the buffering unit is a pressured cylinder with two ends fixed on the sliding block and the base, and the pressurized cylinder is paralleled with the support. And the longitudinal positioning units are holes. The junction unit consists of a pair of movable wings allowing the locking pins to be inserted into the holes on the support, and an elastic unit allowing the wings to get back its original position after moving. The lower part of the support mentioned above is pivoted on the base with an inclined angular-positioning unit for limiting the support to incline within a certain range of angles. A better way is to pivot the support on the base using a hinge, and hence using the friction created by the hinge and the base to sustain an inclined angle.

The inclined angular-positioning unit consists of a pair of frames fixed on the base, a pair of flanges fixed on the bottom of the support, an insert and a pair of shafts. Each one of the frames has an axis aimed at the axle holes, and also has a notch on the outside edge. Each of the flanges on the bottom of the support has an axis aimed at the axle holes. The function of the insert is to allow inlay into the notches of the frames. Both of the shafts are inserted through the axle holes on each side and then pivoted onto the support and the flange with nuts.

The base mentioned previously includes a rotary base, and a fixed base pivoted onto the rotary base. The support is installed onto the rotary base. An interface circuitry board can be built into the base, and preferred, the interface circuitry board act as an interface for plugging accessories such as USB connectors; video connectors; headphones; LAN connector such as a Ethernet port is the network connection to a server; parallel port connectors connecter to parallel ports to connect to such as a printer; serial port connectors to connect to legacy devices such as a modem, measuring equipment or data probe; and et cetera.

This invention neglects the need of using both hands when operating the monitor to move up or down, and has also no need to use the other hand to hold or support the monitor while moving it. The support of this invention is a combination of three major capabilities, namely adjustable height, able to be turned, and able to be inclined backwards. Furthermore, it also includes other useful functions such as the installation of the interface circuitry board into the base allowing other accessories to be plugged into thus achieving greater efficiency. In other words, this is a new invention for a LCD monitor-supporting device with base that has an interface for plugging other input/output devices into.

The support of this invention will also save space, unlike other previous cases where a large rotational space is required. Another characteristic of this invention is that a pressurized cylinder aids the height adjustment, and can effectively prevent the monitor from falling down suddenly or accidentally.

DETAILED DESCRIPTION OF THE PREFERRED EMBODIMENTS

Figure 1:
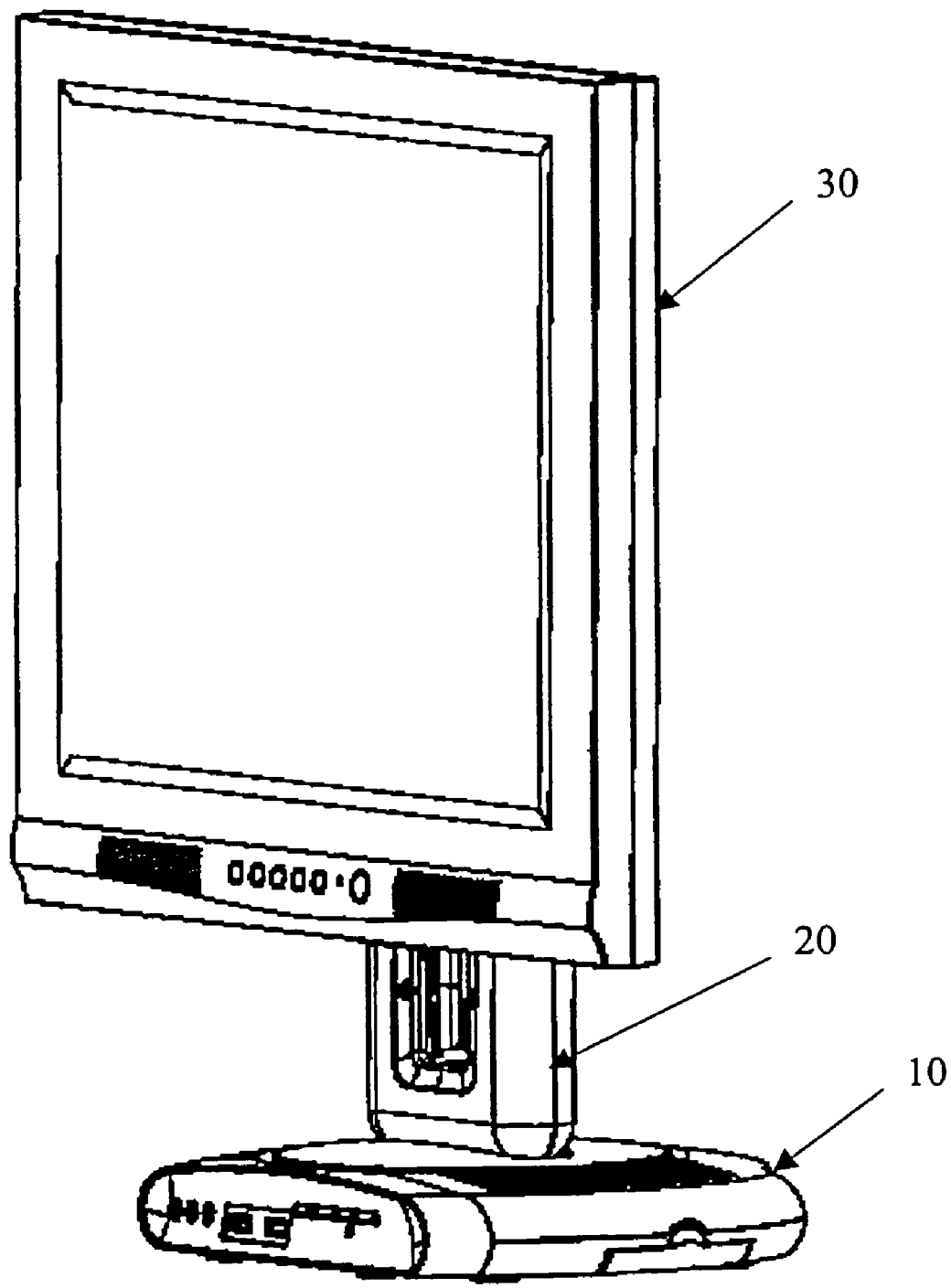
FIG. 1 is a perspective view of the preferred embodiment of this invention when fully assembled.
Figure 2:
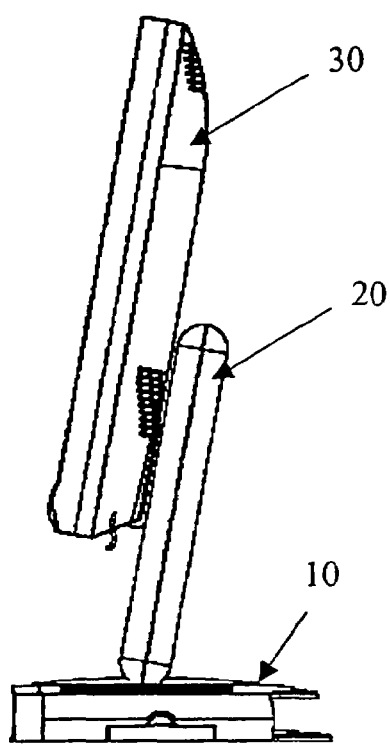
FIG. 2 is the side view of this invention which showing the preferred embodiment of the possibility of backward inclination.
Figure 3:
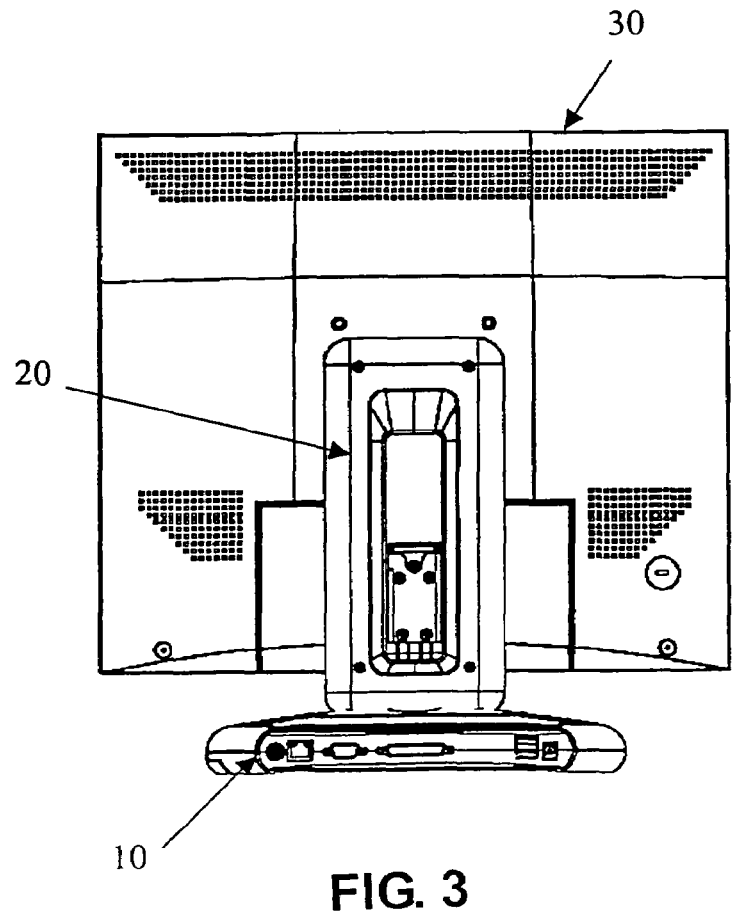
FIG. 3 is the rear view of this invention which showing the preferred embodiment of the monitor after being lowered.

As FIG. 1 to FIG. 5 shows, specifically as shown in FIG. 2, the assembly of this invention consists of a base (10) and a support (20). The support (20) is used for securing a weight unit, in this embodiment, a monitor (30), and the monitor (30) will be able to rotate, incline backwards (as shown in FIG. 2), be lifted (as shown in FIG. 1) or be lowered (as shown in FIG. 3).

Figure 4:
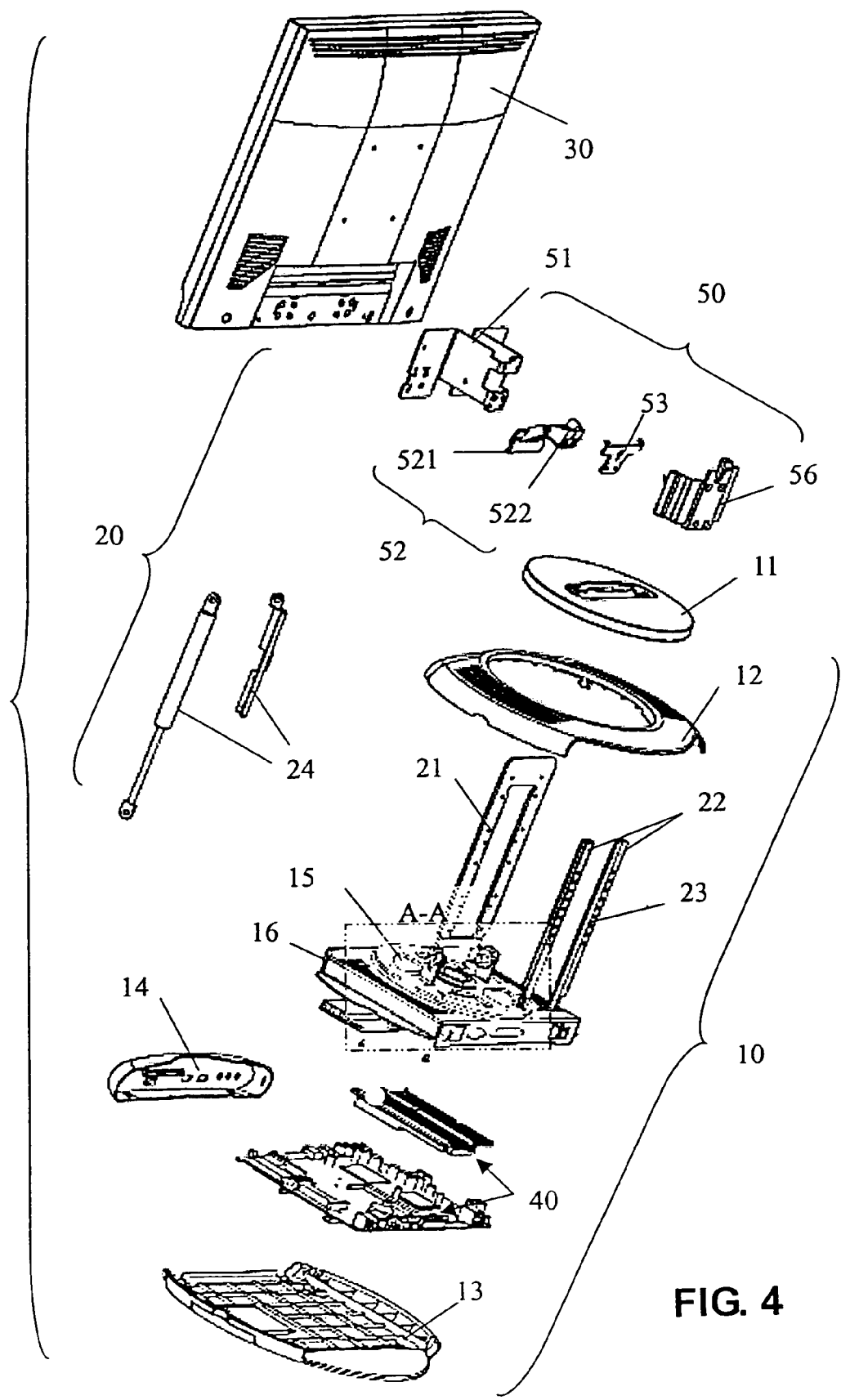
FIG. 4 is the exploded view of the preferred embodiment of the supporting/lifting device of this invention.
Figure 5:
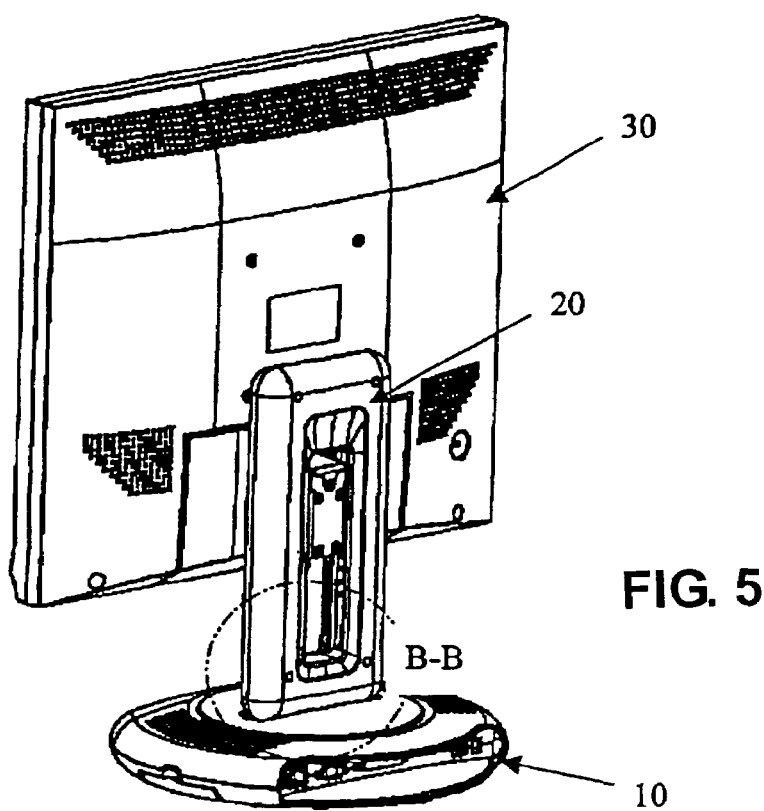
FIG. 5 is another rear perspective view of the preferred embodiment of this invention.
Figure 6:
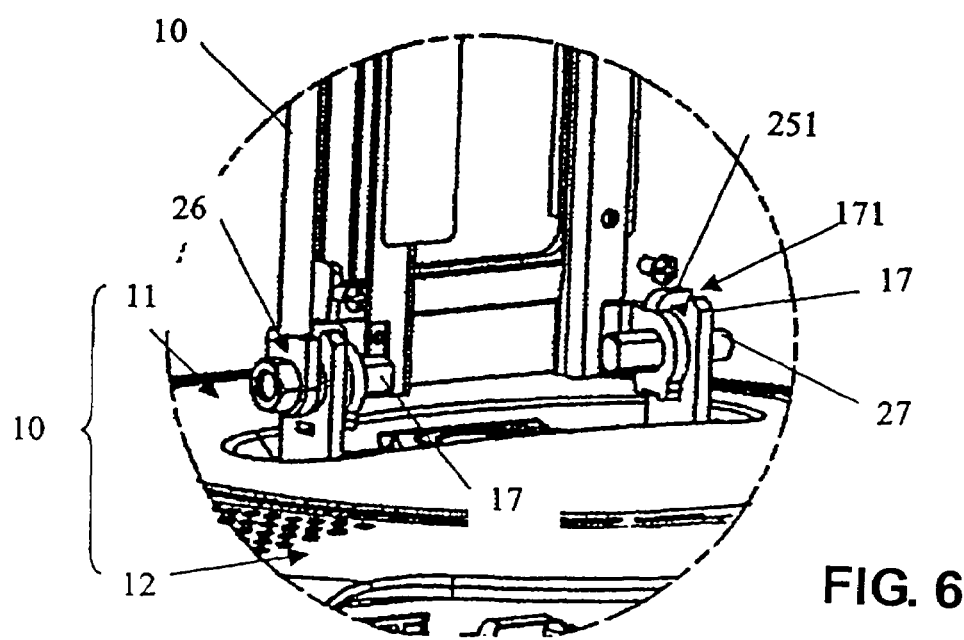
FIG. 6 is an enlarged view of the B-B area in FIG. 5, showing the construction details of the supporting unit and the base.
Figure 7:
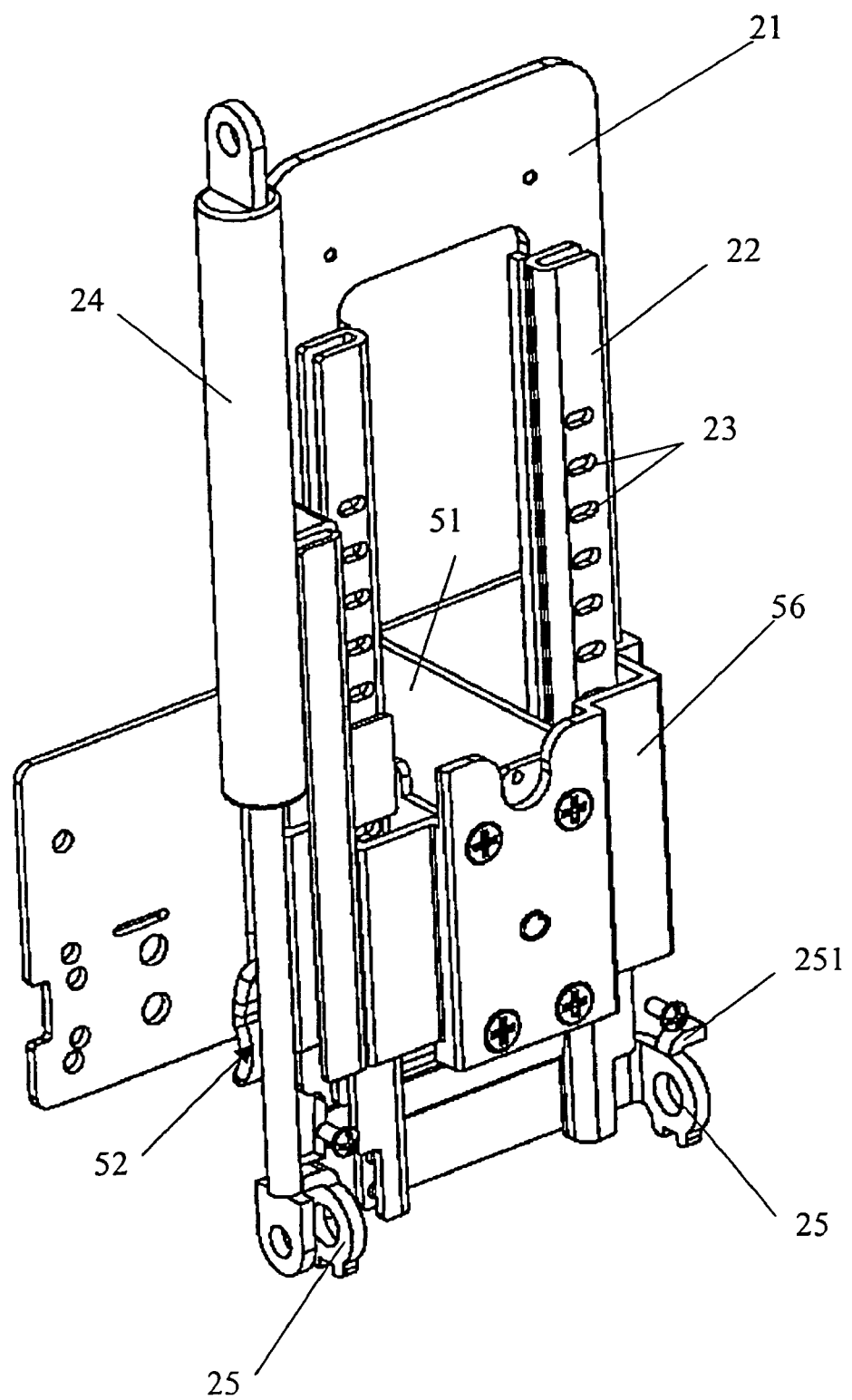
FIG. 7 is a perspective view showing the construction details of the supporting unit and the junction unit of this invention.
Figure 9:
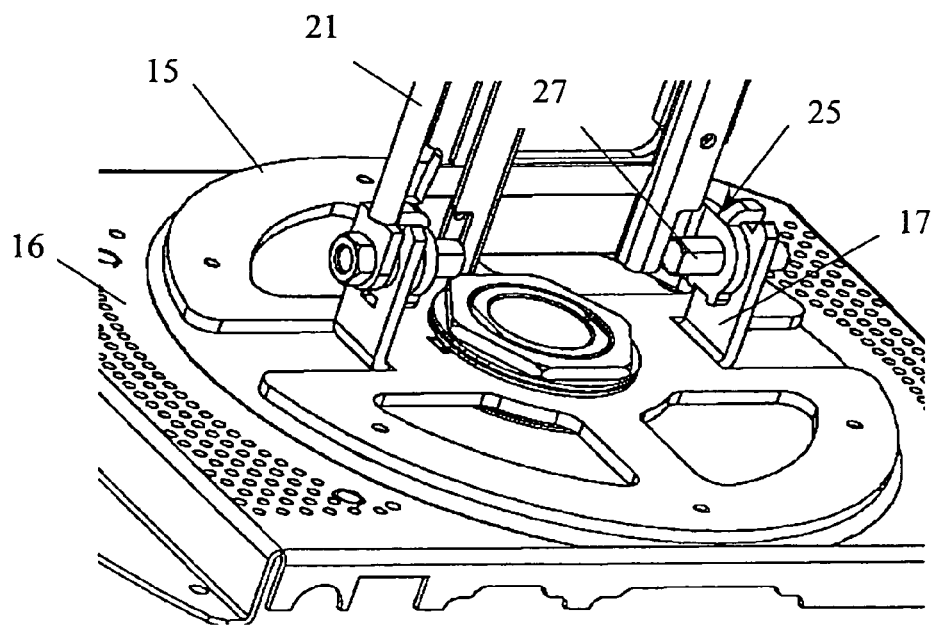
FIG. 9 is an enlarged view of the A-A area in FIG. 4, showing the construction details of the base.

The support (20) is fixed onto the base (10) as illustrated in details in FIGS. 4 and 9, and refers to FIGS. 5 and 6. Wherein FIG. 6 is the B-B area in FIG. 5 enlarged showing the joining details of the base (10) and the support (20). And FIG. 9 is an enlarged partial view of the A-A area in FIG. 4 showing the construction details of the base (10). The exterior of the base (10) preferred mainly consists a base case (13), a surface plate (14), an upper case (12) and a rotary case (11). Inside the base (10), there is a rotary base (15) pivoted onto a fixed base (16) using short shafts or equivalent joining unit, and then fix the main support (21) of the support (20) onto the rotary base (15), hence the monitor (30) that is supported by the main support (21) can be turned. The support (20) preferred has a pair of rails (22) mounted onto the main support (21) as shown in FIGS. 5 to 7. Each of the rails (22) preferred has a plurality of longitudinal positioning units. More specifically, the longitudinal positioning units are holes (23).

It is preferred that an interface circuitry board (abbreviated to ICB) assembly (40) can be installed into the base (10). The ICB assembly (40) is fixed between the fixed base (16) and the base case (13) (refer to FIG. 4). On the side of the fixed base (16) there is an all-in-one connection port assembly and this port assembly is linked to the ICB assembly (40). In the order of piecing together the parts from the bottom, the base case (13) has the ICB assembly (40) and the fixed base (16) fixed on top, and then fix the upper case (12) on top of the base case (13), thus forming the base (10). The rotary case (11) will cover the rotary base (15), and can be turned together with the rotary base (15).

Figure 8:
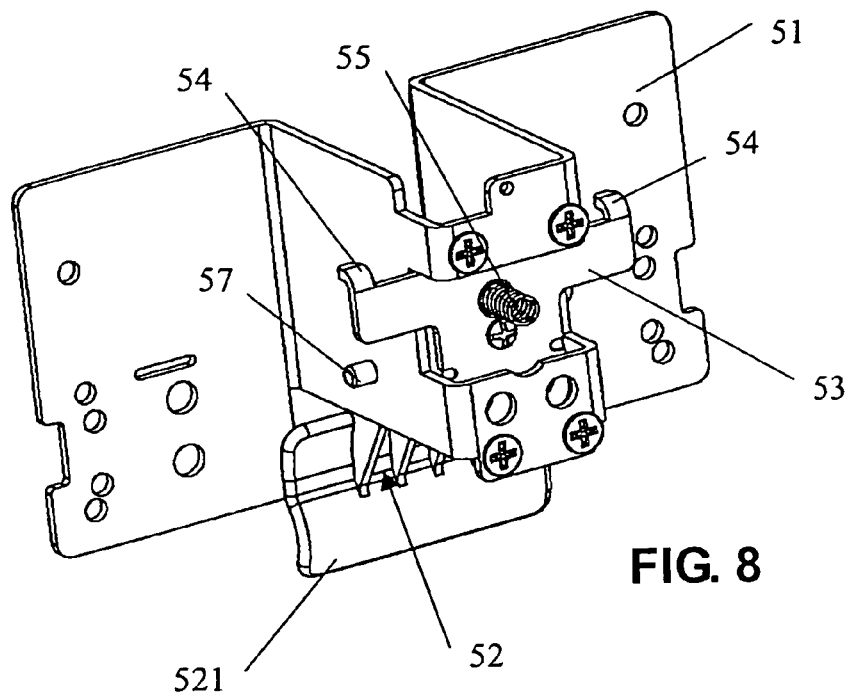
FIG. 8 is an exploded view of the junction unit in FIG. 7 without the back plate.

The back of the monitor (30) is fixed on a sliding block (51) which can be moved up or down freely along the rails (22). A junction unit (50) is fixed onto the sliding block (51) allowing the sliding block (51) to be locked into position on any of the holes (23), therefore, the height of the monitor (30) can be adjusted and kept at a suitable level desired by the user. Looking at FIGS. 4, 7 and 8, the junction unit (50) on the sliding block (51) is mainly constructed by using a movable handle (52), a pair of wings (53) that can follow the movement of the handle (52), a spring (55) that will help the pair of wings (53) to get back to its original position (refer to FIG. 8), and a back plate (56). There are holes at the middle section of the handle (52), and is then pivoted onto the sliding block (51) using the axles (57) (refer to FIG. 8).

In other words, the junction unit (50) consists of the pair of movable wings (53), using the axles to pivot it into the holes on the back plate (56), also an elastic unit, which preferred is the spring (55), to allow the pair of wings (53) to get back to its original position after moving. When users pull the bottom half (521) of the handle (52) the top half (522) will move towards the monitor (30) (refer to FIG. 4). The top half (522) of the handle (52) is connected to the bottom of the pair of wings (53), while on each side of the top of the pair of wings (53) there is a lug (54). After piecing together, the spring (55) will be kept between the pair of wings (53) and the back plate (56) pushing against the pair of wings (53) for most of the times, letting the lugs (54) on each side of the pair of wings (53) be inlayed into the holes (23) of the set of rails (22), this way the sliding block (51) will not move instantaneously. After construction, the space between the sliding block (51) and the back plate (56) will be just enough to fit the main support (21) and the set of rails (22), thus the sliding block (51) can be lifted up or lowered down.

When users pull the bottom half (521) of the handle (52), the top half (522) will move towards the monitor (30) and so will the bottom half of the pair of wings (53). When the bottom half of the pair of wings (53) will move towards the monitor (30), the top half of it will move towards the back plate (56), causing the lugs (54) on each side of the pair of wings (53) to be released from the holes (23) on the set of rails (22). As long as the user release the bottom half (521) of the handle (52), the spring (55) will push the pair of wings (53) and the handle (52) back to their original position.

Furthermore, the support (20) preferred includes a buffering unit (24) between the sliding block (51) and the base (10). The buffering unit (24) will create a variable supporting force to ensure that the monitor (30) will not fall instantaneously when the said junction unit (50) is temporarily released for height adjustment from the said positioning units. In practice, the buffering unit (24) is a pressurized cylinder with two ends fixed on the sliding block (51) and the base (10), and the pressurized cylinder is paralleled with the support (20) (see FIG. 7). When the user pulls the bottom half (521) of the handle (52) causing the lugs (54) to be released from the holes (23) on the set of rails (22), the combined weight of the sliding block (51) and the monitor (30) will be absorbed by the buffering unit (24) and will lowly lower itself down without worrying that it will fall down instantaneously. Therefore, by using the handle (52), the user can easily adjust the height of the monitor (30) on one hand.

As FIG. 6 shows, the bottom end of the support (20) is pivoted onto the base (10), and between the support and the base there is preferred an inclined angular-positioning unit used for limiting the angles of inclination of the support. It is better described as using a hinge unit (26) to pivot the support onto the base (10), and using the friction between the hinge unit (26) and the base (10) for securing the support (20) and the monitor (30), thus keeping an angle relative to the base (10). But in order to prevent the inclination angle of the monitor (30) to be too large, and the combined weight of the support (20) and the monitor (30) will be exceeding the friction between the hinge unit (26) and the base (10), another inclined angular-positioning unit is installed.

FIGS. 6 and 7 show that the inclined angular-positioning unit preferred consists of the following elements: a pair of frames (17) that is fixed on the base (10), a pair of flanges (25) fixed at the bottom of the support (20), an insert (251) extended from the flange (25), and a pair of shafts (27) that is used by the hinge unit (26). Each of the pair of frame (17) has an axis aimed at the axle hole, letting the shaft (27) to be inserted through. On the top edge of the frame (17) is a notch (171), and the function of the insert (251) is to be inlayed into the notch (171). The width of the notch (171) is greater than the width of the insert (251), hence within a certain range of angles the insert (25) can move inside it and so allowing the monitor (30) to incline within a particular angle. The pair of shafts (27) is passed through the axle holes and secured by nuts, pivoting the frames (17) and the flange (25) together.

Certain embodiments of the invention may provide one or more technical advantages. A technical advantage of one embodiment may be that the monitor (30) can be lifted or lowered, inclined backwards, and also turned on the base. Another technical advantage of one embodiment may be that a pressurized cylinder aids the process of height adjustment, which can effectively prevent the possibility of having the monitor falling down instantaneously when adjusting its height. So it can be easily operated without the need to use both hands. The base may contain an interface circuitry board allowing connections of other accessories.

While this disclosure has been described in terms of certain embodiments, alterations and permutations of the embodiments will be apparent to those skilled in the art. Accordingly, the above description of example embodiments does not constrain this disclosure. Other changes, substitutions, and alterations are also possible without departing from the spirit and scope of this disclosure, as defined by the following claims.

What is claimed is:

1. A terminal computer display assembly comprising a monitor, a base, and a support; said support fixes said monitor onto said base with the following improvements:
    said support having a set of rails and a plurality of positioning units in a longitudinal direction thereof;
    said monitor is fixed on a sliding block coupled with said set of rails allowing said monitor to move up or down freely along said rails;
    a junction unit coupled with said sliding block to lock onto any of the positioning units along said support; and
    a buffering unit disposed between said sliding block and said base to prevent said monitor from falling instantaneously when said junction unit is temporarily released from said positioning unit.

2. The terminal computer display assembly of claim 1, wherein said buffering unit is a pressurized cylinder disposed between said monitor and said base.

3. The terminal computer display assembly of claim 2, wherein said buffering unit is paralleled with said support.

4. The terminal computer display assembly of claim 1, wherein said pluralities of positioning units are holes disposed on said support.

5. The terminal computer display assembly of claim 4, wherein said junction unit consists of a pair of wings that have holes to allow an axle to be passed through to join with a back plate; and an elastic unit to allow said pair of wings to move back to the original position.

6. The terminal computer display assembly of claim 4, wherein the bottom of said support is pivoted on the base, and also has an inclined angular-positioning unit to limit the range of angles of the backward inclination of said support.

7. The terminal computer display assembly of claim 1, wherein said support is pivoted onto said base by using a hinge, and using the friction between said hinge and said base to maintain an inclined angle.

8. The terminal computer display assembly of claim 6, wherein said inclined angular-positioning unit comprising:
    a pair of frames fixed onto said base; each of said pair of frame has an axis aimed at the shaft's hole and the notch on the top edge of said frame;
    a pair of flanges fixed at the bottom of said support; each of said pair of flange has an axis aimed at the axle hole with an insert for inlaying into the notch of said support; and
    a pair of shafts to pass through said axle holes and pivoting said pair of frames and said flange using nuts.

9. The terminal computer display assembly of claim 1, wherein said base comprising a rotary base and a fixed base pivoted on said rotary base; said support is fixed onto the said rotary base.

10. The terminal computer display assembly of claim 1, wherein said base contains an interface circuitry board.

11. A lifting device assembly includes a base, a support while said support is fixed onto said base with the following improvements:
    said support having a pair of rails and a plurality of positioning units along said rails;
    a sliding block to hold a weight unit, and said sliding block can be moved along said rails;
    a junction unit fixed onto said sliding block for securing the sliding block in any one of the positioning units; and
    a buffering unit pivoted between said sliding block and said base to prevent sudden falling of said weight unit when said junction unit is temporarily released from said positioning units for height adjustment.

12. The assembly of claim 11, wherein said weight unit is a LCD monitor.

13. The assembly of claim 11, wherein said base comprised of a rotary base and a fixed base pivoted on said rotary base; said support is fixed onto said rotary base.

14. The assembly of claim 13, wherein said buffering unit is pivoted between said sliding block and said rotary base.

15. The assembly of claim 11, wherein the bottom end of said support is pivoted onto said base and also has an inclined angular-positioning unit to limit the range of angles of the backward inclination of said support.

16. The assembly of claim 15, wherein said inclined angular-positioning unit comprising:
    a pair of frames fixed onto said base; each of said pair of frame has an axis aimed at the shaft's hole and the notch on the top edge of said frame;
    a pair of flanges fixed at the bottom of said support; each of said pair of flange has an axis aimed at the axle hole with an insert for inlaying into the notch of said support; and
    a pair of shafts to pass through said axle holes and pivoting said pair of frames and said flange using nuts.

* * * * *